(Model.)

R. J. SMITH.
HAY STACKING MACHINE.

No. 412,555.  Patented Oct. 8, 1889.

2 Sheets—Sheet 1.

(Model.)
2 Sheets—Sheet 2.
R. J. SMITH.
HAY STACKING MACHINE.
No. 412,555. Patented Oct. 8, 1889.
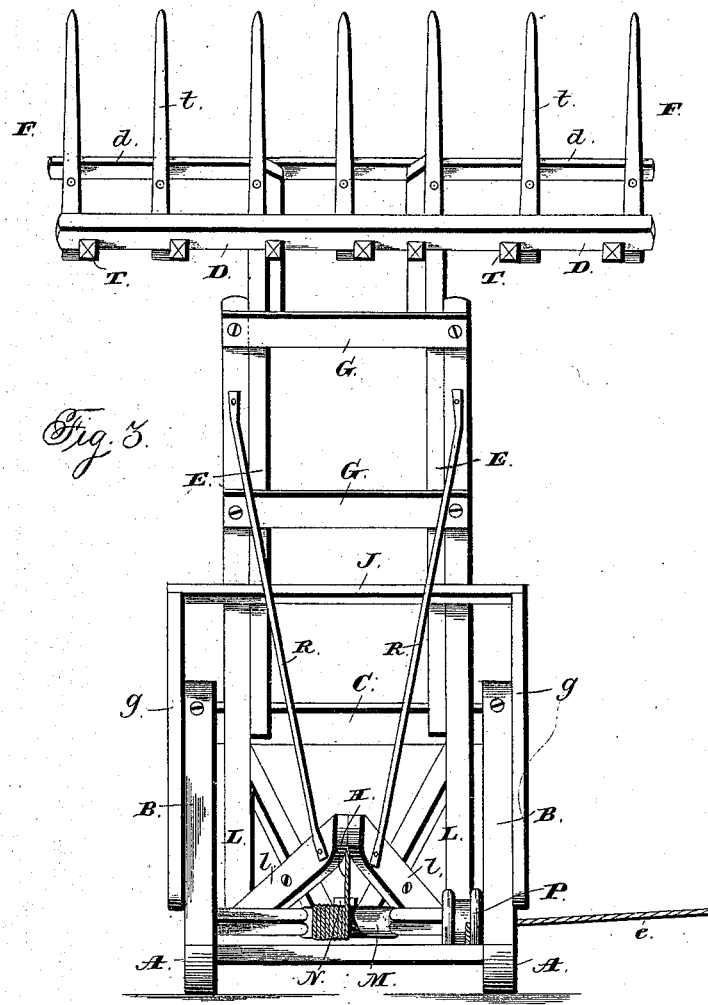
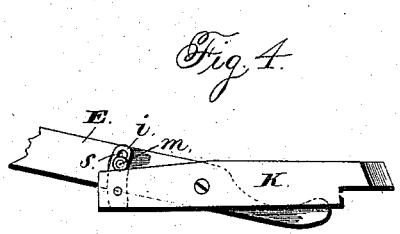
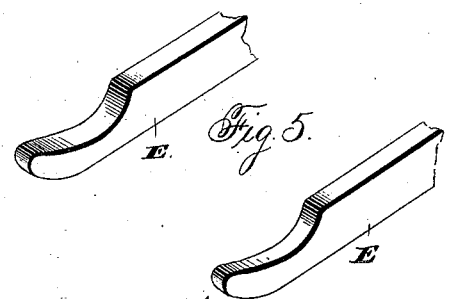

UNITED STATES PATENT OFFICE.

RUBEN J. SMITH, OF OSCEOLA, IOWA.

HAY-STACKING MACHINE.

SPECIFICATION forming part of Letters Patent No. 412,555, dated October 8, 1889.

Application filed July 1, 1887. Serial No. 243,196. (Model.)

*To all whom it may concern:*

Be it known that I, RUBEN J. SMITH, of Osceola, in the county of Clarke and State of Iowa, have invented a certain new and useful Hay-Stacking Machine; and I do hereby declare the following to be a full, clear, and exact description of the invention, such as will enable others skilled in the art to which it pertains to make and use it, reference being had to the accompanying drawings, which form part of this specification.

My invention relates to hay-stacking machines.

My invention consists of a hay-stacking machine so arranged and adjusted as to combine strength and durability, and, further, in a lever-frame having extension-arms provided with knees, to which a fork is attached, a roller and pulley attached to one end thereof, a rope attached to the said roller and to a brace erected on the front end of said lever-frame, and a rope attached to said pulley, by which the lever-frame is raised and lowered.

It further consists in two sets of arms pivotally attached to the front piece of the A-braces, and so arranged and adapted that the weights carried by one set equalize the draft as the loaded fork is being raised, and after the fork has been emptied said weight draws the lever-frame back to such a point that the weight of the fork will carry the end of the lever-frame to which the fork is attached to the ground. The extension-arms enable the operator to build a stack to any desired height within the distance of the fork from the ground.

It consists, further, in a hinge-latch to attach to the front end of the lever-frame when the fork is carried forward to such a point that the top row of teeth in the fork are in a horizontal position.

Figure 1:
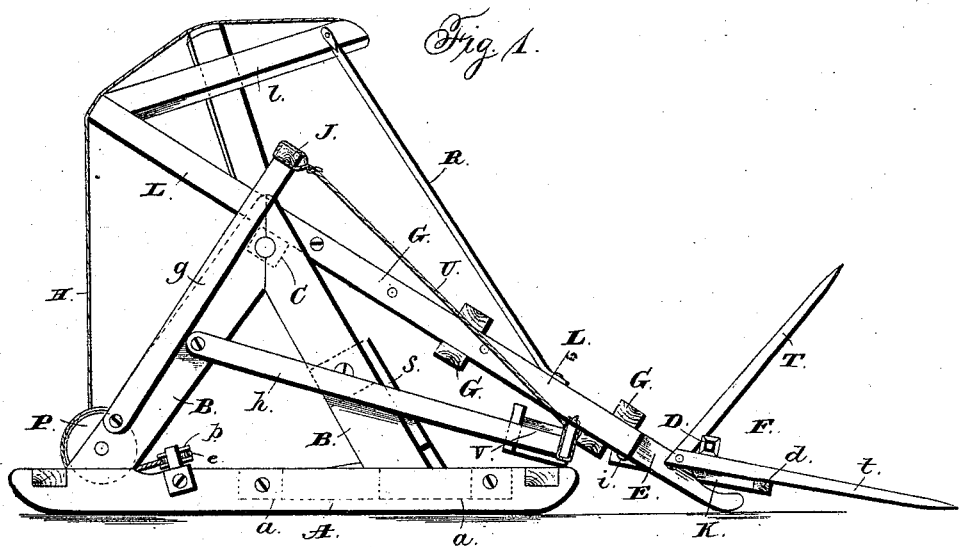
Figure 2:

In the accompanying drawings, Figure 1 represents a side view of my hay-stacking machine with the fork resting on the ground. Fig. 2 represents a side view of my hay-stacking machine with the fork held in place by the hinge-latch or hook, the upper teeth of the fork in a horizontal position. Fig. 3 is a front view of my hay-stacking machine with the fork in the same position as in Fig. 2. Fig. 4 represents the knees K K, showing the attachment of the plates attached to the knees, also the slots in the plates. Fig. 5 shows the extreme ends of the extension-levers after the fork and knees have been detached therefrom.

A represents the bottom frame of my hay-stacking machine, constructed of suitable material and of proper dimensions, the ends of the side pieces being rounded at the bottom to allow the machine to be drawn from place to place.

B B are two braces, one of which is erected on each side of the bottom frame as near the front as practicable, in the apex of which works a bar or shaft C, forming the fulcrum on which the lever-frame L L rests. The lever-frame is provided with extension-arms E E, that slide between the guides G G G G, which are securely bolted to the lever-frame. The fork F is adjustably attached to the extreme ends of the extension-arms by means of knees K K being loosely bolted thereto, one end of each knee passing under the bar D of the fork and resting on a smaller bar $d$, to which it is bolted. On the other end of each knee is bolted a plate of iron $i$ of convenient size, provided with a slot $s$, through which a bolt $m$ passes, holding the plate to the inside of the extension-arms at any desired angle of the knees.

T represents the upper row of teeth in the fork, and $t$ the lower row. The upper row is fastened to the bar D, and the heads of the upper and lower tooth in each row are securely bolted together, and the lower row is bolted to the bar $d$. The upper and lower rows of teeth are set and securely fastened at an acute angle to each other, the object being to prevent the hay from being blown off by the wind and to allow the upper row of teeth to be set in a horizontal position by the hinged latch, hereinafter described.

Upon the front end of the lever-frame is erected a brace $l$, from the extreme point of which to a point on the lever-frame extend two iron rods R, for the purpose of strengthening the lever-frame and the brace thereon. The brace is composed of pieces of strong material securely bolted to each other and to the lever-frame. Two of these pieces are set at the corners of the front end of the lever-frame, meeting at a point above the bar or shaft C. Extending from a point on the inside of the lever-frame near the bar C, and passing inside of the pieces extending from the front end of the lever-frame, are two other pieces; but these do not meet in a point. They are so arranged that the outer surface of the cross-piece joining the two ends of the second two pieces described is equally distant from the fulcrum with the end of the lever-frame and the point of the brace thereon. The object of this arrangement of the brace on the lever-frame is that the power may be equally applied to the lever-frame in lifting the fork, and that the strain in lifting may be endwise of the timbers in said brace.

On the front end of the bottom frame of the machine, reaching from one side thereof to the other, is a roller M, on one end of which is a pulley P, having a rope attached thereto and passing back between two small pulleys $p$, (only one of which is shown,) to the free end of which rope $e$ is attached the horse or other power for working the machine.

H is a rope reaching from the apex of the brace $l$ to the roller M, to each of which it is securely fastened. Its use is to pull the front end of the lever-frame down till the fork is thrown over the required distance, which is done by means of the roller and pulley to which the rope is attached.

The upper and lower rows of teeth are securely fastened at an acute angle to each other, the object of which is to prevent the hay from being scattered by the wind or the motion of the machine. The use of the extension-lever is to throw the hay to any height practicable and to make the topping out on the stack easy.

Attached to the inside braces $a$ $a$ of the bottom frame of the machine is a hinge-latch or hook N, which catches the front end of the lever-frame when the fork is raised to a little past the perpendicular. The latch is raised by means of a small cord $c$, the free end of which reaches outside the frame of the machine within easy reach. The object of this latch or hook is to hold the loaded fork in such a position that the hay will be within easy reach of the man on the stack, and that he may take it as needed for the purpose of topping out. It also relieves the horse of the load until the latch is loosened from the end of the frame, which is done by pulling on the cord $c$ after the fork has been carried a little farther toward the stack.

Pivotally attached to the front arm of the braces B are two sets of arms, the first set represented by $g$ and attached near the bottom of the brace. The second set $h$ are attached about half-way up the arm of the brace. The first set are connected by the bar J, which passes above the lever-frame and back of the brace B, erected thereon, the second set supporting at the extremities thereof a trough or box V, so constructed as to hold weights of any desired quantity or kind. A rope U connects the two arms on each side at their extremities, and when the lever-frame is raised to nearly a perpendicular it strikes the bar J, and thereby raises the weight at the end of the arms $h$, the object being to equalize the draft and to draw the fork back after the hay is deposited on the stack until its own weight will carry it to the ground.

$s$ $s$ $s$ are stays for the braces B B.

From a careful study of the foregoing it will be seen that my hay-stacking machine is very simple in construction, light, durable, and requiring but little power to operate it. The loss of power caused by placing the fulcrum so near the front end of the lever-frame is compensated by the size of the pulley as compared with the roller.

The horse may be attached to either side of the machine, the small pulleys $p$ $p$ allowing the rope to be drawn in either direction or at any angle from the side of the machine.

No claim is made herein to the combination, with the lever-frame, of the sets of pivoted arms $g$ $h$, having the cross-bars respectively above and below the lever-frame, and the ropes connecting their outer ends, as this construction is claimed in my pending application for Letters Patent of the United States, Serial No. 298,052, filed January 30, 1889.

Having fully described my invention, what I claim as new, and what I desire to secure by Letters Patent, is—

1. In a hay-stacking machine, the combination, with two A-braces and a lever-frame provided with extension-arms, knees adjustably attached to said extension-arms, a fork attached to said knees, and a brace erected upon the front end of said lever-frame, of a roller with a pulley at one end, a rope extending from said roller to the point of the brace erected upon the front end of said lever-frame, and a rope attached to the pulley on the end of said roller passing between two smaller pulleys, to the free end of which rope the horse or other power for working said machine may be attached, substantially as set forth.

2. The hay-stacking machine having the base-frame provided with the A-braces B, the lever-frame pivoted intermediate its ends between the said braces and having the upwardly-projecting brace $l$ at its inner end, the fork at the outer end of the said lever-frame, the rods R, attached to the lever-frame and to the brace $l$, the drum mounted on the base-frame, the pulley also on said base-frame, the rope H, connecting the drum to the inner end of the lever-frame and the brace $l$ thereof, and the operating-rope $e$, attached to the drum and passing around the pulley, substantially as described.

3. In a hay-stacking machine, the combination, with two A-braces and a lever-frame having extension-arms, adjustable knees attached to said extension-arms, a fork attached to said knees, said fork having two rows of teeth securely set at an acute angle to each other, a brace erected upon the front end of the lever-frame, a rope attached to the point of said brace, the other end of which rope is attached to said roller, a pulley on one end of said roller of sufficient size to equalize the power lost on the lever-frame, and a rope attached to said pulley and passing back between two small pulleys, of a hinge-latch or hook attached to the braces in the bottom of the machine, said latch being adapted to be worked by means of a cord, substantially as set forth.

In testimony that I claim the foregoing I have hereunto set my hand this 7th day of June, A. D. 1887.

RUBEN J. SMITH.

Witnesses:
 S. F. YOUNKIN,
 W. S. BUSICK.